United States Patent
Denis

(10) Patent No.: US 10,449,614 B2
(45) Date of Patent: Oct. 22, 2019

(54) SYSTEMS AND METHODS FOR SOLID STATE SENSOR MEASUREMENTS OF WELDING CABLES

(71) Applicant: ILLINOIS TOOL WORKS INC., Glenview, IL (US)

(72) Inventor: Marc Lee Denis, Lena, WI (US)

(73) Assignee: Illinois Tool Works Inc., Glenview, IL (US)

(*) Notice: Subject to any disclaimer, the term of this patent is extended or adjusted under 35 U.S.C. 154(b) by 515 days.

(21) Appl. No.: 14/575,725

(22) Filed: Dec. 18, 2014

(65) Prior Publication Data

US 2016/0175963 A1    Jun. 23, 2016

(51) Int. Cl.
| | |
|---|---|
| B23K 9/09 | (2006.01) |
| B23K 9/095 | (2006.01) |
| B23K 9/10 | (2006.01) |
| H04B 3/54 | (2006.01) |

(52) U.S. Cl.
CPC .......... *B23K 9/0953* (2013.01); *B23K 9/0956* (2013.01); *B23K 9/1006* (2013.01); *B23K 9/1062* (2013.01); *H04B 3/54* (2013.01); *H04B 2203/5458* (2013.01)

(58) Field of Classification Search
CPC .. B23K 9/0953; B23K 9/0956; B23K 9/1006; B23K 9/1062; B23K 9/08; B23K 9/095; H04B 3/54; H04B 3/28; H04B 3/30; H04B 2203/5458
See application file for complete search history.

(56) References Cited

U.S. PATENT DOCUMENTS

| | | | |
|---|---|---|---|
| 2,043,331 | A | 6/1936 | Notvest |
| 2,175,891 | A | 10/1939 | Graham |
| 2,526,597 | A | 10/1950 | Winslow |
| 2,617,913 | A | 11/1952 | Oestreicher |
| 2,642,515 | A | 6/1953 | Bagg |
| 3,496,328 | A | 2/1970 | Moerke |

(Continued)

FOREIGN PATENT DOCUMENTS

| | | |
|---|---|---|
| CN | 101147045 | 3/2008 |
| CN | 101516561 | 8/2009 |

(Continued)

OTHER PUBLICATIONS

International Search Report from PCT application No. PCT/US2015/059641, dated Feb. 24, 2016, 12 pgs.

(Continued)

*Primary Examiner* — Brian W Jennison
(74) *Attorney, Agent, or Firm* — McAndrews, Held & Malloy, Ltd.

(57) ABSTRACT

In one embodiment, a welding system having a welding power supply configured to provide welding power is provided. The welding system additionally includes a weld cable coupled to the power supply and configured to transmit the welding power, and a welding torch coupled to the weld cable and configured to apply the welding power to produce a welding arc. The welding system also includes a magnetic field sensor disposed on the weld cable proximate to the welding torch, wherein the welding power supply comprises control circuitry configured to adjust the welding power based at least in part on a signal received from the magnetic field sensor.

18 Claims, 3 Drawing Sheets

(56) References Cited

U.S. PATENT DOCUMENTS

| | | | |
|---|---|---|---|
| 3,689,734 A | 9/1972 | Burley | |
| 3,689,737 A | 9/1972 | Eckles | |
| 3,930,209 A | 12/1975 | Popick | |
| 3,992,565 A | 11/1976 | Gatfield | |
| 4,051,344 A | 9/1977 | Robbins | |
| 4,079,231 A | 3/1978 | Toth | |
| 4,147,919 A * | 4/1979 | Matasovic | B23K 9/1087 219/130.32 |
| 4,216,367 A | 8/1980 | Risberg | |
| 4,216,368 A | 8/1980 | Delay | |
| 4,227,066 A | 10/1980 | Bulwidas | |
| 4,247,752 A | 1/1981 | Stringer | |
| 4,266,114 A | 5/1981 | Hansen | |
| 4,359,622 A | 11/1982 | Dostoomian | |
| 4,384,188 A | 5/1983 | Wright | |
| 4,410,789 A | 10/1983 | Story | |
| 4,438,317 A | 3/1984 | Ueguri | |
| 4,450,340 A | 5/1984 | Corrigall | |
| 4,467,174 A | 8/1984 | Gilliland | |
| 4,471,399 A | 9/1984 | Udren | |
| 4,479,215 A | 10/1984 | Baker | |
| 4,508,954 A | 4/1985 | Kroll | |
| 4,521,671 A | 6/1985 | Fronius | |
| 4,521,672 A | 6/1985 | Fronius | |
| 4,531,045 A | 7/1985 | Kemp | |
| 4,544,826 A | 10/1985 | Nakanishi | |
| 4,561,059 A | 12/1985 | Davis | |
| 4,584,685 A | 4/1986 | Gajjar | |
| 4,608,482 A | 8/1986 | Cox | |
| 4,641,292 A | 2/1987 | Tunnell | |
| 4,728,768 A * | 3/1988 | Cueman | B23K 9/22 219/109 |
| 4,749,935 A | 6/1988 | Osborne | |
| 4,767,908 A | 8/1988 | Dallavalle | |
| 4,769,754 A | 9/1988 | Reynolds | |
| 4,794,232 A | 12/1988 | Kimbrough | |
| 4,866,247 A | 9/1989 | Parks | |
| 4,918,517 A | 4/1990 | Burgoon | |
| 4,947,021 A | 8/1990 | Stava | |
| 4,973,821 A | 11/1990 | Martin | |
| 5,039,835 A | 8/1991 | Schwiete | |
| 5,043,557 A | 8/1991 | Tabata | |
| 5,059,766 A | 10/1991 | Gilliland | |
| 5,063,282 A | 11/1991 | Gilliland | |
| 5,276,305 A | 1/1994 | Hsien | |
| 5,278,390 A | 1/1994 | Blankenship | |
| 5,357,078 A | 10/1994 | Smith | |
| 5,376,894 A | 12/1994 | Petranovich | |
| 5,406,050 A | 4/1995 | Macomber | |
| 5,591,355 A | 1/1997 | Ishikawa | |
| 5,600,550 A | 2/1997 | Cookll | |
| 5,614,811 A | 3/1997 | Sagalovich | |
| 5,625,863 A | 4/1997 | Abraham | |
| 5,653,902 A | 8/1997 | Chang | |
| 5,834,916 A | 11/1998 | Shimogama | |
| 5,841,807 A | 11/1998 | Hannebauer | |
| 5,864,116 A | 1/1999 | Baker | |
| 5,982,253 A | 11/1999 | Perrin | |
| 5,991,169 A | 11/1999 | Kooken | |
| 6,015,964 A | 1/2000 | Baker | |
| 6,040,555 A | 3/2000 | Tiller | |
| 6,091,048 A | 7/2000 | Lanouette | |
| 6,103,994 A | 8/2000 | Decoster | |
| 6,104,707 A | 8/2000 | Abraham | |
| 6,111,216 A | 8/2000 | Stava | |
| 6,130,407 A * | 10/2000 | Villafuerte | B23K 9/0956 219/130.01 |
| 6,154,488 A | 11/2000 | Hunt | |
| 6,156,999 A | 12/2000 | Ignatchenko | |
| 6,160,241 A | 12/2000 | Stava | |
| 6,166,506 A | 12/2000 | Pratt | |
| 6,172,888 B1 | 1/2001 | Jochi | |
| 6,225,596 B1 | 5/2001 | Chandler | |
| 6,225,598 B1 | 5/2001 | Nihei | |
| 6,275,144 B1 | 8/2001 | Rumbaugh | |
| 6,288,631 B1 | 9/2001 | Shinozaki | |
| 6,321,139 B1 | 11/2001 | Terada | |
| 6,321,167 B1 | 11/2001 | Jochi | |
| 6,359,258 B1 | 3/2002 | Blankenship | |
| 6,365,874 B1 | 4/2002 | Stava | |
| 6,423,936 B1 | 7/2002 | Reed | |
| 6,458,157 B1 | 10/2002 | Suaning | |
| 6,479,791 B1 | 11/2002 | Kowaleski | |
| 6,479,795 B1 | 11/2002 | Albrecht | |
| 6,570,132 B1 | 5/2003 | Brunner | |
| 6,596,970 B2 | 7/2003 | Blankenship | |
| 6,624,388 B1 | 9/2003 | Blankenship et al. | |
| 6,627,849 B2 | 9/2003 | Ihde | |
| 6,649,869 B2 | 11/2003 | Reynolds | |
| 6,653,597 B2 | 11/2003 | Baum | |
| 6,710,297 B1 | 3/2004 | Artelsmair | |
| 6,710,927 B2 | 3/2004 | Richards | |
| 6,717,108 B2 | 4/2004 | Hsu | |
| 6,781,095 B2 | 8/2004 | Hayes | |
| 6,818,860 B1 | 11/2004 | Stava | |
| 6,906,285 B2 | 6/2005 | Zucker | |
| 6,909,285 B2 | 6/2005 | Jordan | |
| 6,930,279 B2 | 8/2005 | Myers | |
| 7,049,545 B2 | 5/2006 | Matus | |
| 7,049,547 B1 | 5/2006 | Brunner | |
| 7,064,290 B2 | 6/2006 | Blankenship | |
| 7,076,215 B1 | 7/2006 | Moliere | |
| 7,105,772 B2 | 9/2006 | Houston | |
| 7,173,214 B2 | 2/2007 | Nadzam | |
| 7,205,503 B2 | 4/2007 | Reynolds | |
| 7,260,325 B2 | 8/2007 | Meroth | |
| 7,301,308 B2 | 11/2007 | Aker | |
| 8,049,140 B2 | 11/2011 | Kawamoto | |
| 8,199,536 B2 | 6/2012 | Mangraviti | |
| 8,225,598 B2 | 7/2012 | Haeberer | |
| 8,269,141 B2 | 9/2012 | Daniel | |
| 8,278,882 B2 | 10/2012 | Gotou | |
| 8,345,819 B2 | 1/2013 | Mastronardi | |
| 8,410,398 B2 | 4/2013 | Daniel | |
| 8,455,794 B2 | 6/2013 | Vogel | |
| 8,525,077 B2 | 9/2013 | Peters | |
| 8,546,729 B2 | 10/2013 | Derda | |
| 8,581,147 B2 | 11/2013 | Kooken | |
| 8,653,413 B2 | 2/2014 | Vogel | |
| 8,785,816 B2 | 7/2014 | Kooken | |
| 9,089,922 B2 | 7/2015 | Bunker | |
| 9,352,411 B2 | 5/2016 | Batzler | |
| 9,511,443 B2 | 12/2016 | Pfeifer | |
| 2001/0001616 A1 | 5/2001 | Rakib | |
| 2001/0043656 A1 | 11/2001 | Koslar | |
| 2002/0117488 A1 | 8/2002 | Arndt | |
| 2003/0089693 A1 | 5/2003 | Hayes | |
| 2003/0156014 A1 | 8/2003 | Kodama | |
| 2004/0069759 A1 | 4/2004 | Davidson | |
| 2004/0199846 A1 | 10/2004 | Matsumoto | |
| 2005/0087523 A1 | 4/2005 | Zucker | |
| 2005/0230372 A1 | 10/2005 | Ott | |
| 2006/0027546 A1 | 2/2006 | Reynolds | |
| 2006/0054610 A1 | 3/2006 | Morimoto | |
| 2006/0076335 A1 | 4/2006 | Reynolds | |
| 2006/0086706 A1 | 4/2006 | Ulrich | |
| 2006/0138113 A1 | 6/2006 | Ott | |
| 2006/0175313 A1 | 8/2006 | Kooken | |
| 2006/0226130 A1 | 10/2006 | Kooken | |
| 2006/0243716 A1 | 11/2006 | Stava | |
| 2007/0056942 A1 | 3/2007 | Daniel et al. | |
| 2007/0080154 A1 | 4/2007 | Ott | |
| 2007/0114216 A1 | 5/2007 | Ott | |
| 2007/0181547 A1 | 8/2007 | Vogel | |
| 2007/0267395 A1 | 11/2007 | Broadwater | |
| 2008/0078812 A1 | 4/2008 | Peters | |
| 2008/0198650 A1 | 8/2008 | Shalvi | |
| 2008/0311938 A1 | 12/2008 | Song | |
| 2009/0173726 A1 | 7/2009 | Davidson | |
| 2009/0200281 A1 * | 8/2009 | Hampton | B23K 9/0953 219/130.33 |
| 2009/0236325 A1 | 9/2009 | Gozalbo | |
| 2010/0187914 A1 | 7/2010 | Rada | |

(56) References Cited

U.S. PATENT DOCUMENTS

| | | | |
|---|---|---|---|
| 2010/0308026 A1* | 12/2010 | Vogel | H02M 3/157 219/130.21 |
| 2010/0308027 A1 | 12/2010 | Vogel | |
| 2011/0043374 A1 | 2/2011 | Bannister | |
| 2011/0069766 A1 | 3/2011 | Takahashi | |
| 2011/0073569 A1 | 3/2011 | Rappl | |
| 2011/0108536 A1 | 5/2011 | Inada | |
| 2011/0134976 A1 | 6/2011 | Fossion | |
| 2011/0220619 A1 | 9/2011 | Mehn | |
| 2011/0240620 A1 | 10/2011 | Ott | |
| 2011/0248009 A1 | 10/2011 | Long | |
| 2012/0000895 A1 | 1/2012 | Sato | |
| 2012/0037354 A1 | 2/2012 | McCoy | |
| 2012/0076212 A1 | 3/2012 | Zeppetelle | |
| 2012/0097644 A1 | 4/2012 | Ott | |
| 2012/0099864 A1 | 4/2012 | Ishihara | |
| 2012/0128042 A1 | 5/2012 | Tzou | |
| 2012/0161516 A1 | 6/2012 | Koshin | |
| 2012/0195384 A1 | 8/2012 | Sato | |
| 2012/0207057 A1 | 8/2012 | Karaoguz | |
| 2012/0248080 A1* | 10/2012 | Hutchison | B23K 9/0956 219/130.21 |
| 2013/0092672 A1 | 4/2013 | Peters | |
| 2013/0119036 A1 | 5/2013 | Daniel | |
| 2013/0128938 A1 | 5/2013 | Yanagisawa | |
| 2013/0214599 A1 | 8/2013 | Taira | |
| 2013/0249397 A1 | 9/2013 | Chandran | |
| 2013/0288211 A1 | 10/2013 | Patterson | |
| 2013/0327747 A1* | 12/2013 | Dantinne | B23K 9/0953 219/130.21 |
| 2013/0327753 A1 | 12/2013 | Roth | |
| 2014/0001169 A1 | 1/2014 | Enyedy | |
| 2014/0027428 A1* | 1/2014 | DuVal | B23K 9/1006 219/133 |
| 2014/0076872 A1 | 3/2014 | Ott | |
| 2014/0233620 A1 | 8/2014 | Bernheim | |
| 2014/0263256 A1 | 9/2014 | Rappl | |
| 2014/0265897 A1 | 9/2014 | Taipale | |
| 2014/0269873 A1* | 9/2014 | Tahir | H04W 52/241 375/227 |
| 2014/0269874 A1 | 9/2014 | Afkhami | |
| 2014/0374397 A1 | 12/2014 | Vogel | |
| 2015/0117464 A1 | 4/2015 | Miyamoto | |
| 2015/0196970 A1 | 7/2015 | Denis | |
| 2015/0244474 A1 | 8/2015 | Young | |
| 2015/0258621 A1 | 9/2015 | Ulrich | |
| 2015/0375330 A1 | 12/2015 | Doi | |

FOREIGN PATENT DOCUMENTS

| | | |
|---|---|---|
| CN | 102372248 | 3/2012 |
| CN | 103732342 | 4/2014 |
| DE | 4112985 | 10/1992 |
| EP | 0575082 | 12/1993 |
| EP | 0970775 | 1/2000 |
| EP | 1138429 | 10/2001 |
| EP | 1586403 | 10/2005 |
| EP | 1748573 | 1/2007 |
| EP | 1767952 | 3/2007 |
| EP | 2020758 | 2/2009 |
| FR | 2850463 | 7/2004 |
| GB | 2393338 | 3/2004 |
| JP | S59193768 | 11/1984 |
| JP | 61137675 | 6/1986 |
| JP | S61273260 | 12/1986 |
| JP | 162966 | 6/1992 |
| JP | 04162964 | 6/1992 |
| JP | 04162966 | 6/1992 |
| JP | 05104248 | 2/1993 |
| JP | H1133729 | 2/1999 |
| JP | 2001276971 | 10/2001 |
| JP | 2003088957 | 3/2003 |
| JP | 2003154455 | 5/2003 |
| JP | 2003191075 | 7/2003 |
| JP | 2003236663 | 8/2003 |
| KR | 20130104722 | 9/2013 |
| WO | 0028795 | 1/2000 |
| WO | 2008140398 | 1/2008 |
| WO | 2009149425 | 12/2009 |
| WO | 2010051104 | 5/2010 |
| WO | 2011041037 | 4/2011 |
| WO | 2012058164 | 5/2012 |
| WO | 2013152146 | 1/2013 |

OTHER PUBLICATIONS

Echelon, "PL 3120 / PL 3150 Power Line Smart Transceiver Data Book," Version 2, 005-0154-01, 255 pgs.
Hackl et al, "Digitally Controlled GMA Power Sources," Fronius, www.fronius.com/worldwide/usa/products/paper_digitally_controlld_power_sources_gb.pdf, pp. 1-7, publication date not provided.
Intellon, "CEBus Power Line Encoding and Signaling," White Paper #0027, Mar. 1997, Version 0.1, pp. 1-6.
International Search Report from PCT application No. PCT/US2015/056128, dated Feb. 12, 2016, 13 pgs.
International Search Report from PCT application No. PCT/US2015/060762, dated Mar. 11, 2016, 13 pgs.
Neu, Thomas, "Impact of Sampling-Clock Spurs on ADC Performance," Texas Instruments Incorporated, 2009, 11 pgs.
Communication Appln No. 15 804 258.0 issued by the European Patent Office dated Nov. 28, 2018, 5 pgs.
Canadian Office Action Appln No. 2,970,281 dated Mar. 5, 2019, 5 pgs.
International Search Report from PCT application No. PCT/US2015/059840, dated Feb. 24, 2016, 12 pgs.
Canadian Office Action Appln. No. 2,970,283 dated Mar. 6, 2019, 3 pgs.

\* cited by examiner

SYSTEMS AND METHODS FOR SOLID STATE SENSOR MEASUREMENTS OF WELDING CABLES

BACKGROUND

The present disclosure relates generally to welding systems and, more particularly, to systems and methods for solid state sensors for welding cable measurements.

Welding is a process that has become increasingly prevalent in various industries and applications. Such processes may be automated in certain contexts, although a large number of applications continue to exist for manual welding applications. In both cases, such welding applications rely on a variety of types of equipment to ensure that the supply of welding consumables (e.g., wire, shielding gas, etc.) is provided to the weld in an appropriate amount at the desired time. For example, metal inert gas (MIG) welding typically relies on a wire feeder to enable a welding wire to reach a welding torch. The wire is continuously fed during welding to provide filler metal. A welding power source ensures that arc heating is available to melt the filler metal and the underlying base metal.

In certain applications, power cables supply power from the welding power source to a welding torch performing a welding application. For example, the welding power source may provide a welding voltage and current that may be utilized between the welding torch and a workpiece to perform the welding application. However, the arrangement and characteristics of power cables within the welding system may cause various distortions within the weld cable system that influence the welding process voltage and current. It may be beneficial to provide for systems and methods that efficiently and accurately compensate for distortions within the weld cable system and that provide for improved welding cable measurement systems.

BRIEF DESCRIPTION

Certain embodiments commensurate in scope with the originally claimed present disclosure are summarized below. These embodiments are not intended to limit the scope of the claimed present disclosure, but rather these embodiments are intended only to provide a brief summary of possible forms of the present disclosure. Indeed, the present disclosure may encompass a variety of forms that may be similar to or different from the embodiments set forth below.

In one embodiment, a welding system having a welding power supply configured to provide welding power is provided. The welding system additionally includes a weld cable coupled to the power supply and configured to transmit the welding power, and a welding torch coupled to the weld cable and configured to apply the welding power to produce a welding arc. The welding system also includes a magnetic field sensor disposed on the weld cable proximate to the welding torch, wherein the welding power supply comprises control circuitry configured to adjust the welding power based at least in part on a signal received from the magnetic field sensor.

In another embodiment a method is provided. The method includes receiving a signal from a magnetic field sensor disposed on a weld cable proximate to a welding torch performing a welding system operation. The method additionally includes analyzing the signal to determine a current. The method also includes deriving an adjustment to a welding system based on at least the determined current. The method further includes applying the adjustment to the welding system.

In another embodiment a welding system includes a weld cable configured to be coupled between a welding power supply and a welding torch and to transmit welding power from the welding power supply to the welding torch. The welding system additionally includes weld cable communications (WCC) circuitry configured to transmit and receive tones to characterize the weld cable, and to send data to the welding power supply when the welding power supply is coupled to the weld cable. The welding system further includes a magnetic field sensor disposed on the weld cable and configured to sense a signal representative of a welding current measurement, wherein the data comprises the welding current.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The techniques described herein improve measurement and control of voltages and currents used in welding equipment, such as equipment used in welding, cutting, grinding, induction heating, testing, and so on. The welding equipment may more precisely operate at certain voltages and currents, for example, by providing for desired waveforms used in more precisely controlling a welding arc. However, impedance of the welding cable may alter the welding power delivered to the workpiece such that it is significantly different than the welding power, for example, at terminal outputs of the welding power supply. The techniques described herein provide for a solid state magnetic field sensor and for techniques suitable for more precisely measuring current close to or on a welding torch.

Advantageously, the solid state magnetic field sensor may be combined with signal processing (e.g., digital signal processing [DSP]) techniques to calibrate sensor drift, to null ambient fields to facilitate welding, to provide for gain compensation, and/or to subtract contributions of stray magnetic fields from adjacent welding processes, thus improving welding equipment control and work quality. Additionally or alternatively, the solid state magnetic field sensor may be combined with certain techniques provided by weld cable communications (WCC) circuitry suitable for communications via a weld cable and also suitable for characterizing the weld cable. That is, certain characteristics of a specific weld cable may be derived by the WCC circuitry, such as impedance, resistance, and the like, that may result in power supplied by the welding power supply being slightly different than power being applied to the workpiece. The WCC derivations may be compared with measurements obtained via the solid state magnetic field sensor to further adjust the WCC and/or welding power supply, thus improving welding operations.

Figure 1:
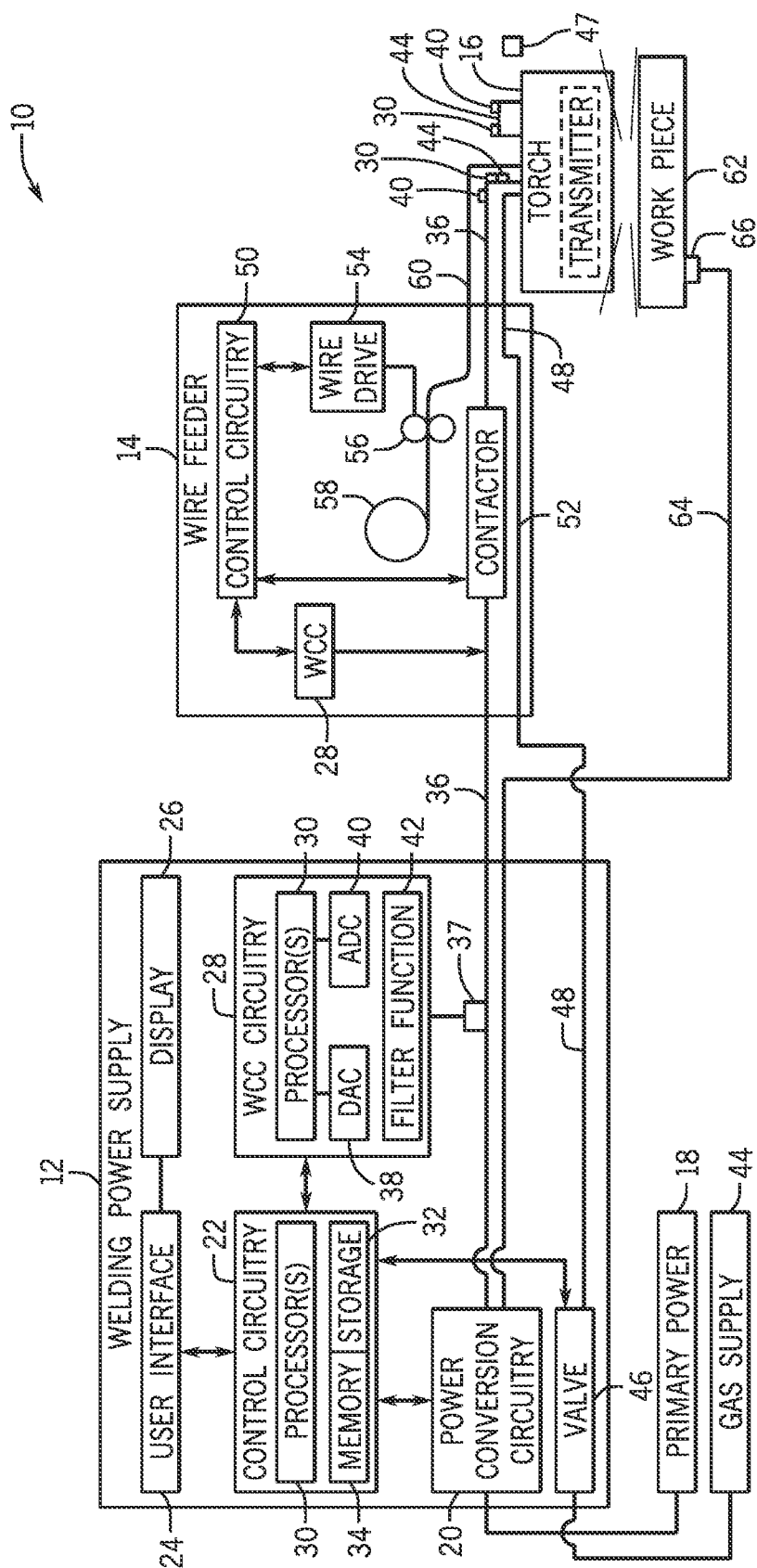
FIG. 1 is a block diagram of an embodiment of a welding system with a welding power supply having a magnetic field sensor and weld cable communications circuitry (WCC), in accordance with aspects of the present disclosure.

Turning now to the drawings, FIG. 1 is a block diagram of an embodiment of a welding system 10 having a welding power supply 12, a wire feeder 14, and a welding torch 16. The welding system 10 powers, controls, and supplies consumables to a welding application. In certain embodiments, the welding power source 12 directly supplies input power to the welding torch 16. The welding torch 16 may be a torch configured for stick welding, tungsten inert gas (TIG) welding, or gas metal arc welding (GMAW), based on the desired welding application. In the illustrated embodiment, the welding power source 12 is configured to supply power to the wire feeder 14, and the wire feeder 14 may be configured to route the input power to the welding torch 16. In addition to supplying an input power, the wire feeder 14 may supply a filler metal to a welding torch 14 for various welding applications (e.g., GMAW welding, flux core arc welding (FCAW)).

The welding power supply 12 receives primary power 18 (e.g., from the AC power grid, an engine/generator set, a battery, or other energy generating or storage devices, or a combination thereof), conditions the primary power, and provides an output power to one or more welding devices in accordance with demands of the system 10. The primary power 18 may be supplied from an offsite location (e.g., the primary power may originate from the power grid). Accordingly, the welding power supply 12 includes power conversion circuitry 20 that may include circuit elements such as transformers, rectifiers, switches, and so forth, capable of converting the AC input power to AC or DC output power as dictated by the demands of the system 10 (e.g., particular welding processes and regimes).

In some embodiments, the power conversion circuitry 20 may be configured to convert the primary power 18 to both weld and auxiliary power outputs. However, in other embodiments, the power conversion circuitry 20 may be adapted to convert primary power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes control circuitry 22 to control the operation of the welding power supply 12. The welding power supply 12 also includes a user interface 24. The control circuitry 22 may receive input from the user interface 24 through which a user may choose a process and input desired parameters (e.g., voltages, currents, particular pulsed or non-pulsed welding regimes, and so forth). The user interface 24 may receive inputs using any input device, such as via a keypad, keyboard, buttons, touch screen, voice activation system, wireless device, etc. Furthermore, the control circuitry 22 may control operating parameters based on input by the user as well as based on other current operating parameters. Specifically, the user interface 24 may include a display 26 for presenting, showing, or indicating, information to an operator. The control circuitry 22 may also include interface circuitry for communicating data to other devices in the system 10, such as the wire feeder 14. For example, in some situations, the welding power supply 12 may wirelessly communicate with other welding devices within the welding system 10. Further, in some situations, the welding power supply 12 may communicate with other welding devices using a wired connection, such as by using a network interface controller (NIC) to communicate data via a network (e.g., ETHERNET, 10baseT, 10base100, etc.). In particular, the control circuitry 22 may communicate and interact with weld cable communications (WCC) circuitry 28, as further described in detail below.

The control circuitry 22 includes at least one controller or processor 30 that controls the operations of the welding power supply 12, and may be configured to receive and process multiple inputs regarding the performance and demands of the system 10. Furthermore, the processor 30 may include one or more microprocessors, such as one or more "general-purpose" microprocessors, one or more special-purpose microprocessors and/or ASICS, or some combination thereof. For example, in certain embodiments, the processor 30 may include one or more digital signal processors (DSPs).

The control circuitry 22 may include a storage device 32 and a memory device 34. The storage device 32 (e.g., nonvolatile storage) may include ROM, flash memory, a hard drive, or any other suitable optical, magnetic, or solid-state storage medium, or a combination thereof. The storage device 32 may store data (e.g., data corresponding to a welding application), instructions (e.g., software or firmware to perform welding processes), and any other suitable data. As may be appreciated, data that corresponds to a welding application may include an attitude (e.g., orientation) of a welding torch, a distance between the contact tip and a workpiece, a voltage, a current, welding device settings, and so forth.

The memory device 34 may include a volatile memory, such as random access memory (RAM), and/or a nonvolatile memory, such as read-only memory (ROM). The memory device 34 may store a variety of information and may be used for various purposes. For example, the memory device 34 may store processor-executable instructions (e.g., firmware or software) for the processor 30 to execute. In addition, a variety of control regimes for various welding processes, along with associated settings and parameters, may be stored in the storage device 32 and/or memory device 34, along with code configured to provide a specific output (e.g., initiate wire feed, enable gas flow, capture welding current data, detect short circuit parameters, determine amount of spatter) during operation.

In certain embodiments, the welding power flows from the power conversion circuitry 20 through a weld cable 36 to the wire feeder 14 and the welding torch 16. Furthermore, in certain embodiments, welding data may be provided with the weld cable 36 such that welding power and weld data are provided and transmitted together over the weld cable system. In particular, the WCC circuitry 28 may be communicatively coupled to the weld cable 36 to communicate (e.g., send/receive) data over the weld cable 36. The WCC circuitry 28 may be implemented based on various types of power line communications methods and techniques. For example, the WCC circuitry 28 may utilize IEEE standard P1901.2 to provide data communications over the weld cable 36. In this manner, the weld cable 36 may be utilized to provide welding power from the welding power supply 12 to the wire feeder 14 and the welding torch 16. Furthermore, the weld cable 36 may also be utilized to transmit (and/or receive) data communications to the wire feeder 14 and the welding torch 16. In addition, the WCC circuitry 28 may be communicatively coupled to the weld cable 36, for example, via a cable data coupler 37, to characterize the weld cable 36, as described in more detail below.

In certain embodiments, the WCC circuitry 28 includes one or more processors 30, a digital to analog convertor 38 (e.g. DAC 38, which may function as a transmitter), an analog to digital converter 40 (e.g., ADC 40, which may function as a receiver), and a filter function 42 (e.g., filter circuitry, digital filter function circuitry, filter function software executable by the one or more processors 30, or any combination thereof). In particular, the WCC circuitry 28 may be utilized to determine channel equalization filter coefficients representative of a distortive characteristic and/or a distortion related to a weld cable. Specifically, the distortive characteristic may be a frequency and time dependent amplitude and phase distortion (e.g., amplitude and/or phase distortion that is both frequency dependent and time dependent), as further described with respect to FIGS. 2-3. Further, the WCC circuitry 28 may be configured to utilize the channel equalization filter coefficients to compensate for the distortive characteristic of the weld cable. In certain embodiments, the WCC circuitry 28 may include one or more processors 30 separate from the processors 30 of the control circuitry 22. In certain embodiments, the WCC circuitry 28 may utilize the processors 30 of the control circuitry 22. In certain embodiments, the WCC circuitry 28 may be incorporated within, or may be coupled to, the control circuitry 22.

The DAC 38 may be coupled to the processor 30, and is configured to transmit data communications utilizing one or more carrier channels or "tones." Specifically, the one or more tones may be described as complex sinusoidal signals that are transmitted by the DAC 38. In certain embodiments, the DAC 38 may be disposed within the welding power supply 12, and the tones may be transmitted to one or more components of the welding system 10, such as to the welding torch 16 and/or the wire feeder 14. In other embodiments, the DAC 38 may be disposed within the welding torch 16, and the tones may be transmitted to the welding power supply 12 and/or the wire feeder 14. Likewise, in other embodiments, one or more components of the WCC circuitry 28 (e.g., the DAC 38, the ADC 40, or the filter function 42) may be disposed anywhere within the welding system 10, such as within the wire feeder 14 and/or the welding torch 16.

In certain embodiments, the DAC 38 may transmit modulated tones and/or unmodulated tones. Modulated tones may be utilized to communicate (e.g., send/receive) data using one or more known techniques for modulating a signal for data transmission. For example, the DAC 38 may utilize a hybrid amplitude and phase modulation scheme, such as Bi-Phase Shift Keying (BPSK), Quadrature Phase Shift Keying (QPSK), 16-ary Quadrature Amplitude Shift Keying (16-QAM) or similar variations. The modulated tones transmitted may include any type of information useful for the welding process or operation. For example, in some situations, the data transmitted by the WCC circuitry 28 may include information related to any welding parameter (e.g., weld voltage, wire speed) that is transmitted to the wire feeder 14 and/or the welding torch 16 for welding applications.

In some embodiments, the DAC 38 may also transmit unmodulated tones (also known as "pilot tones") that do not carry data. Specifically, unmodulated tones may be sinusoidal signals that have predefined or known characteristics, such as a predefined amplitude, frequency and phase. For example, for a given process, the DAC 38 may transmit unmodulated tones having the same amplitude but a different frequency, which may be an integral multiple of a lower reference frequency and a phase offset value. In particular, in certain embodiments, modulated tones may be distinguishable from unmodulated tones based on their assigned frequency, or their position within an OFDM frame. For example, the positional assignment of modulated versus unmodulated tones may be pre-assigned and this position may be known at the receiver (e.g., the ADC 40). Since the characteristics of the unmodulated tones are also known, unmodulated tones may be utilized as reference tones. In certain embodiments, a set of modulated tones with known characteristics may also be transmitted. For example, modulated tones with a known data modulation scheme, and a known (or pre-defined) data sequence may be transmitted in lieu of and/or along with the known unmodulated tones.

Accordingly, the data sequence may be of the form of cyclic prefix within the OFDM frame, for example, such that the last N symbols of an OFDM frame are appended to the beginning of the frame. At the receiver (e.g., the ADC 40), a circular convolution of the received frame may be performed and the results of that convolution may be used to compute the equivalent frequency and time dependent amplitude and phase distortion in the weld cable 36, and from that information a set of coefficients for a correcting channel equalization filter (e.g., an inverse function of the measured distortion) may be determined. Accordingly, in certain embodiments, either a known modulated or a known unmodulated tone may be utilized as a reference. In certain embodiments, the DAC 38 may transmit a plurality of tones, any number of which may be modulated or unmodulated. For example, out of 64 tones transmitted by the DAC 38, 48 of the tones may be modulated tones utilized for data transmission and 16 tones may be unmodulated tones utilized as reference tones (without any data modulation). It should be noted that the DAC 38 may be configured to transmit any number of modulated tones and unmodulated tones.

In some embodiments, the DAC 38 may also transmit unmodulated tones (also known as "pilot tones") that do not carry data. Specifically, unmodulated tones may be sinusoidal signals that have predefined or known characteristics, such as a predefined amplitude, frequency and phase. For example, for a given process, the DAC 38 may transmit unmodulated tones having the same amplitude but a different frequency, which may be an integral multiple of a lower reference frequency and a phase offset value. In particular, in certain embodiments, modulated tones may be distinguishable from unmodulated tones based on their assigned frequency, or their position within an OFDM frame. For example, the positional assignment of modulated versus unmodulated tones may be pre-assigned and this position may be known at the receiver (e.g., the ADC 40). Since the characteristics of the unmodulated tones are also known, unmodulated tones may be utilized as reference tones. In certain embodiments, a set of modulated tones with known characteristics may also be transmitted. For example, modulated tones with a known data modulation scheme, and a known (or pre-defined) data sequence may be transmitted in lieu of and/or along with the known unmodulated tones.

Accordingly, the data sequence may be of the form of cyclic prefix within the OFDM frame, for example, such that the last N symbols of an OFDM frame are appended to the beginning of the frame. At the receiver (e.g., the ADC 40), a circular convolution of the received frame may be performed and the results of that convolution may be used to compute the equivalent frequency and time dependent amplitude and phase distortion in the weld cable 36, and from that information a set of coefficients for a correcting channel equalization filter (e.g., an inverse function of the measured distortion) may be determined. Accordingly, in certain embodiments, either a known modulated or a known unmodulated tone may be utilized as a reference. In certain embodiments, the DAC 38 may transmit a plurality of tones, any number of which may be modulated or unmodulated. For example, out of 64 tones transmitted by the DAC 38, 48 of the tones may be modulated tones utilized for data transmission and 16 tones may be unmodulated tones utilized as reference tones (without any data modulation). It should be noted that the DAC 38 may be configured to transmit any number of modulated tones and unmodulated tones.

Figure 2:
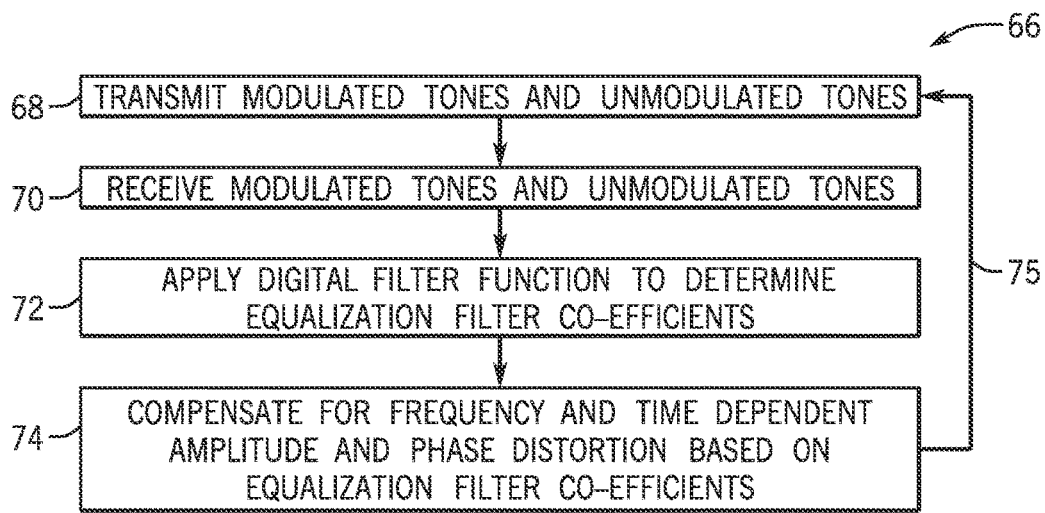
FIG. 2 is a flowchart of an embodiment of a process for compensating for weld cable distortions utilizing one or more weld cable distortion coefficients, in accordance with aspects of the present disclosure.
Figure 3:
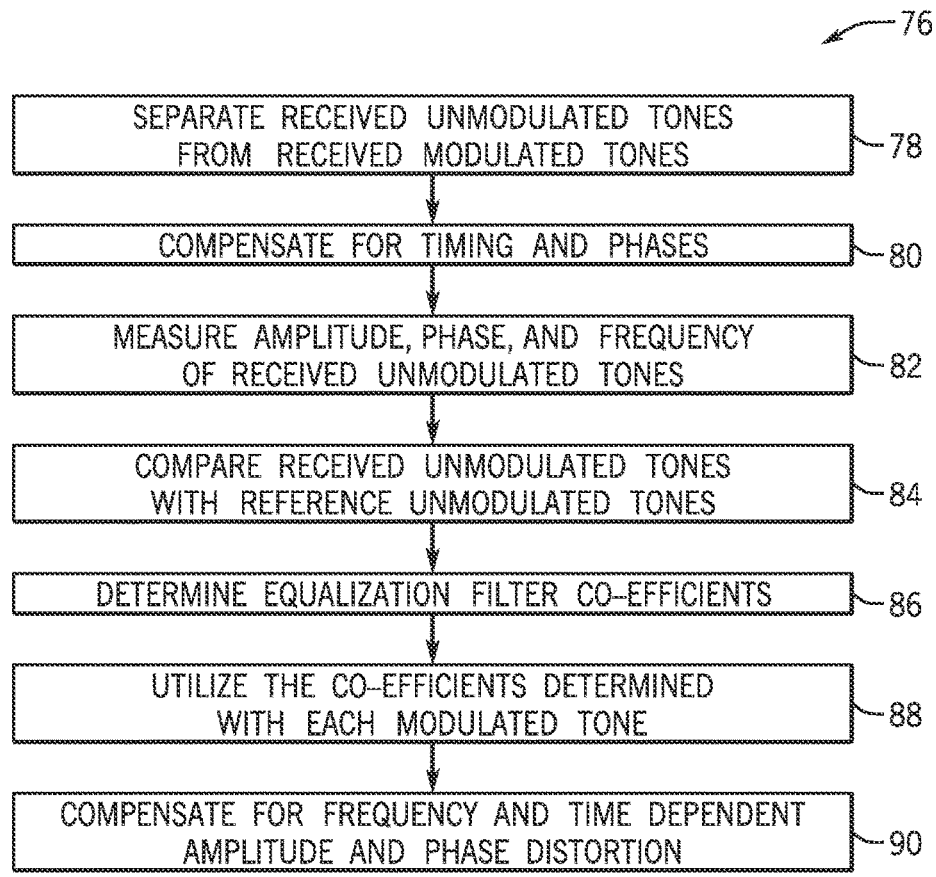
FIG. 3 is a flowchart of an embodiment of a process for calculating the one or more weld cable distortion coefficients of FIG. 2, in accordance with aspects of the present disclosure.

In certain embodiments, the ADC 40 of the WCC circuitry 28 may be configured to receive the several transmitted modulated and unmodulated tones, as described with respect to FIGS. 2-3. Further, the filter function 42 may be configured to process and analyze the received modulated and unmodulated tones to characterize the weld cable 36. More specifically, the filter function 42 of the WCC circuitry 28 may be configured to apply a digital filter function that is configured to compare the unmodulated tones transmitted by the DAC 38 with the unmodulated tones received by the ADC 40. In particular, based on the differences (if any) between the transmitted unmodulated signals and received unmodulated signals, the filter function 42 may be configured to determine one or more coefficients (e.g., values, polynomials, etc.). In certain embodiments, the one or more coefficients may correspond to distortion characteristics of the weld cable 36. Furthermore, the filter function 42 may be configured to utilize the determined coefficients to compensate for possible frequency and time dependent amplitude and phase distortion in the weld cable 36, as further described with respect to FIGS. 2-3. In certain embodiments, the WCC circuitry 28 is configured to communicate with the control circuitry 22, which may be configured to adjust a welding voltage provided to the welding torch 16 (and/or to the wire feeder 14) based on information received from the filter function 42.

Further, in certain embodiments, the storage device 32 or the memory device 34 may be configured to store data related to the WCC circuitry 28, such as characteristics (e.g., a phase, an amplitude, a frequency) of each unmodulated tone transmitted or received by the WCC circuitry 28, information related to the frequency of each tone transmitted or received by the WCC circuitry 28, the number and/or grouping of the unmodulated or modulated tones, the one or more determined frequency and time dependent amplitude and phase distortions in the weld cable 36, the location of the DAC 38 and/or the ADC 40, the channel equalization filter coefficients calculated or determined by the WCC circuitry 28, a current, previous, actual, or corrected welding operating parameter (e.g., welding voltage, wire speed), and any other information related to the WCC circuitry 28. In addition, in certain embodiments, the storage device 32 or the memory device 34 may be configured to store one or more templates of unmodulated (e.g., reference) or modulated tones that have known characteristics. For example, the one or more templates may include 16 unmodulated tones each having a known amplitude, a known frequency, and a known phase shift. When one or more unmodulated tones are received by the WCC circuitry 28, the WCC circuitry 28 may be configured to compare the received modulated or unmodulated tones with a corresponding template.

One or more magnetic field solid state sensor(s) 44 provide for certain measurements at a weld cable 36 location close to the welding torch 16 and/or on the welding torch 16. In certain embodiments, the magnetic field solid state sensor(s) 44 may be disposed on the weld cable 36 proximate to the welding torch 16, such as a location approximately between 0 to 0.5 inches (i.e., less than approximately 0.5 inches), 0.25 to 1 inch, 0 to 5 inches (i.e., less than approximately 5 inches) or more from the welding torch 16 along a length of the weld cable 36. In certain embodiments, the magnetic field solid state sensor(s) 44 may include a microelectromechanical system (MEMS) suitable for converting a magnetic field to a signal, such as a voltage signal, representative of a magnetic field generated by current flowing through the weld cable 36 and detected by the magnetic field solid state sensor(s) 44. The voltage signal may then be processed, for example, by the ADC(s) 40 to convert the signal into data, such as a measurement of a magnetic field and/or measurement of a current. The data may be transmitted to the processor(s) 30, to derive a current being applied through the welding torch 16, as well as to derive certain welding curves (e.g., current curves, voltage curves) used in operations of the welding system 10.

In one embodiment, the magnetic field solid state sensor(s) 44 may include a 1-axis magnetic sensor disposed in a single chip, such as a magnetoresistive sensor model number HMC1061 available from Honeywell, of New Jersey, U.S.A. Additionally or alternatively, the magnetic field solid state sensor(s) 44 may include 2-axis and/or 3-axis sensors. Each axis may be orthogonal to the other axis or axes. Additionally, or alternatively, the magnetic field solid state sensor(s) 44 may include a Hall effect sensor, such as a transducer that varies its output voltage in response to a magnetic field through the Hall effect. Other magnetic field sensor types may be used, suitable for converting a magnetic field into a signal (e.g., voltage signal), including flux gate magnetometers. Because of its relatively small size, reliability, ruggedness, and cost, the magnetic field solid state magnetic field sensor(s) 44 may advantageously provide for a suitable sensor for welding system applications, including welding, cutting, grinding, induction heating, testing, and the like.

In use, signals from the magnetic field solid state sensor(s) 44 may be transmitted to the ADC 40. The ADC 40 may be located in the wire feeder 14, in the welding power supply 12, and or in custom enclosures proximate to the magnetic field solid state sensor(s) 44. The ADC 40 may then convert magnetic field solid state sensor(s) 44 signals into digital data, and communicate the data to the processor(s) 30. The processor(s) 30 may be located in the wire feeder 14, in the welding power supply 12, and or in custom enclosures proximate to the magnetic field solid state sensor(s) 44. Signals from the magnetic field solid state sensor(s) 44 and data from the ADC 40 may be communicated using wired and/or wireless communication techniques. In certain embodiments, the weld cable 36 itself may be used to transmit signals and/or data from the magnetic field solid state sensor(s) 44 and the ADC 40. In one embodiment, WCC circuitry 28 disposed in the welding power supply 12 may communicate with other WCC circuitry 28 disposed, for example, at a weld cable 36 location close to the welding torch 16 (e.g., in the wire feeder 14) and communicatively coupled to the magnetic field solid state sensor 44. Any and all techniques used by the WCC circuitry to transmit via the transmitter 38 and to receive via the receiver 40 may be used. For example, the WCC circuitry 28 may utilize IEEE standard P1901.2 to provide welding power and data communications over the weld cable 36. One or more carrier channels or "tones" may be used as describe above to send data between WCC circuitry 28. In addition to OFDM, the tones may apply cell communication techniques (e.g., code division multiple access [CDMA], global system for mobile [GSM] communications), and the like. Likewise, wireless systems (e.g., WiFi, mesh network systems, RFC systems, Bluetooth systems, ZigBee, and the like) may be communicatively coupled to both the welding power supply 12, the wire feeder 14, and/or to the magnetic field solid state sensor(s) 44 to exchange signals and data representative of the magnetic field near (or at) the welding torch 16. Wired conduits between the welding power supply 12, the wire feeder 14, and/or the magnetic field solid state sensor(s) 44 may also be used for communication.

The processor(s) 30 may receive signals from the magnetic field solid state sensor(s) 44 and/or data from the ADC 40 to derive, for example, the actual current being delivered during operations (e.g., through the weld cable 36 and/or at the welding torch 16), as opposed to the current being measured at the welding power supply 12. The processor(s) 30 may additionally compare certain characterizations of the weld cable 36 derived via the WCC circuitry 28 with data from the magnetic field solid state sensor(s) 44 to calibrate the WCC circuitry 28 and/or the welding power supply 12, as described in more detail below with respect to FIG. 4. Similarly, the processor(s) 30 may use magnetic field solid state sensor(s) 44 signals and/or data to recalibrate the magnetic field solid state sensor(s) 44. For example, the processor(s) 30 may recalibrate sensor drift of the magnetic field solid state sensor(s) 44, apply the magnetic field solid state sensor(s) 44 to null ambient fields to facilitate welding, provide for gain compensation, and/or to subtract contributions of stray magnetic fields from adjacent welding processes, also as described in more detail below with respect to FIG. 4.

In certain embodiments, a gas supply 45 provides shielding gases, such as argon, helium, carbon dioxide, and so forth, depending upon the welding application. The shielding gas flows to a valve 46, which controls the flow of gas, and if desired, may be selected to allow for modulating or regulating the amount of gas supplied to a welding application. The valve 46 may be opened, closed, or otherwise operated by the control circuitry 22 to enable, inhibit, or control gas flow (e.g., shielding gas) through the valve 46. Shielding gas exits the valve 46 and flows through a cable 48 (which in some implementations may be packaged with the welding power output) to the wire feeder 14 which provides the shielding gas to the welding application. As may be appreciated, certain embodiments of the welding system 10 may not include the gas supply 45, the valve 46, and/or the cable 48.

In certain embodiments, the wire feeder 14 may use the welding power to power the various components in the wire feeder 14, such as to power control circuitry 50. As noted above, the weld cable 36 may be configured to provide or supply the welding power. The welding power supply 12 may also communicate with the wire feeder 14 using the weld cable 36 and the WCC circuitry 28 disposed within the welding power supply 12. In certain embodiments, the wire feeder 14 may include the WCC circuitry 28, which is substantially similar to the WCC circuitry 28 of the welding power supply 12. Indeed, the WCC circuitry 28 of the wire feeder 14 may cooperate with the control circuitry 50 of the wire feeder 14 in similar ways as the welding power supply 12 cooperates with the control circuitry 22. The control circuitry 50 controls the operations of the wire feeder 14. In certain embodiments, the wire feeder 14 may use the control circuitry 50 to detect whether the wire feeder 14 is in communication with the welding power supply 12 and to detect a current welding process of the welding power supply 12 if the wire feeder 14 is in communication with the welding power supply 12.

A contactor 52 (e.g., high amperage relay) is controlled by the control circuitry 50 and configured to enable or inhibit welding power to continue to flow to the weld cable 36 for the welding application. In certain embodiments, the contactor 52 may be an electromechanical device, while in other embodiments the contactor 52 may be any other suitable device, such as a solid state device. The wire feeder 14 includes a wire drive 54 that receives control signals from the control circuit 50 to drive rollers 56 that rotate to pull wire off a spool 58 of wire. The wire is provided to the welding application through a wire cable 60. Likewise, the wire feeder 14 may provide the shielding gas through the cable 48. As may be appreciated, in certain embodiments, the cables 36, 48, and 60 may be bundled together or individually provided to the welding torch 16.

The welding torch 16 delivers the wire, welding power, and shielding gas for a welding application. The welding torch 16 is used to establish a welding arc between the welding torch 16 and a workpiece 62. A work cable 64, which may be terminated with a clamp 65 (or another power connecting device), couples the welding power supply 12 to the workpiece 62 to complete a welding power circuit.

FIG. 2 is a flow diagram of an embodiment of a method 66 for correcting a distortive characteristic of the weld cable 36 in the weld system 10, in accordance with aspects of the present disclosure. Specifically, the distortive characteristic may be a frequency and time dependent amplitude and phase distortion of the weld cable 36. The distortive characteristic may be determined by determining one or more channel equalization filter coefficients. Further, the WCC circuitry 28 may compensate for the distortive characteristic by utilizing the determined channel equalization filter coefficients.

As noted above with respect to FIG. 1, the WCC circuitry 28 of the welding power supply 12 may be configured to characterize the parameters or properties of the weld cable 36 with one or more channel equalization filter coefficients. Specifically, the one or more channel equalization filter coefficients may be values that are representative of various characteristics of the weld cable 36. For example, the channel equalization filter coefficients may be representative of a distortive characteristic of the weld cable 36. In other words, the channel equalization filter coefficients may be representative of frequency and time dependent amplitude and phase distortions of the weld cable 36. In this manner, the systems and methods described herein allow for the characterization of the weld cable 36, and obviate the need for taking actual measurements to characterize the weld cable 36, as further described in detail below. Further, the one or more channel equalization filter coefficients may be utilized to compensate for frequency and time dependent amplitude and phase distortion within the weld cable 36 that may influence the power or data being transmitted. For example, certain embodiments address situations in which the welding voltage provided by the welding power supply 12 would be substantially different than the welding voltage received by the welding torch 16 due to frequency and time dependent amplitude and phase distortion in the weld cable 36 if not mitigated. Accordingly, the WCC circuitry 28 may be configured to determine one or more channel equalization filter coefficients that may be representative of distortion characteristics of the weld cable 36. Further, the WCC circuitry 28 may be configured to utilize the one or more channel equalization filter coefficients that are determined to compensate for any frequency and time dependent amplitude and phase distortion within the weld cable 36, as further described below.

The method 66 begins with the WCC circuitry 28 transmitting modulated tones and unmodulated tones (block 68) from the welding power supply 12 and/or the wire feeder 14. Specifically, the DAC 38 of the WCC circuitry 28 (of either the welding power supply 12 or the wire feeder 14) may be configured to transmit the modulated and unmodulated tones. As noted above, modulated tones may include information related to the welding process or operation, such as information related to an operating parameter (e.g., weld voltage, wire speed, etc.) of the welding system 10 or related to an adjusted operating parameter of the welding system 10. In particular, unmodulated tones (e.g., pilot tones) transmitted by the DAC 38 may not carry any information related to the welding process or operation. Instead, unmodulated tones may be sinusoidal reference signals that have predefined or known characteristics, such as a predefined amplitude, frequency, and/or phase. For example, in certain embodiments, all of the unmodulated tones transmitted may have the same frequency and amplitude. In certain embodiments, the modulated tones transmitted may also have known characteristics that allow the modulated tones to be utilized as the reference tones. Furthermore, in certain embodiments, the unmodulated tones may each be transmitted at a known phase. For example, each of the unmodulated tones transmitted may be equally spaced in tone frequency, such that each succeeding tone increments its phase reference to the first tone by 90 degrees. For example, if a first unmodulated tone is at a reference of 0 degrees of phase, a second unmodulated tone may be at 90 degrees phase, a third unmodulated tone may be at 180 degrees phase, and so forth. It should be noted that the unmodulated tones may be configured at any alternate unmodulated tone configuration, so long as the frequency, amplitude and phase configurations are known and substantially constant. For example, in certain embodiments, the phase of each unmodulated tone need not be equally spaced, so long as the phase is known.

The method 66 further includes the WCC circuitry 28 receiving the transmitted modulated and unmodulated tones at the ADC 40 (block 70). In certain embodiments, the WCC circuitry 28 may transmit the modulated tones and unmodulated tones to the welding torch 16 and may receive the transmitted tones from the welding torch 16. In such situations, the WCC circuitry 28 may be configured to account or compensate for the distortion of the weld cable 36 twice and/or in two directions (e.g., a first distortion from the WCC circuitry 28 to the welding torch 16 and a second distortion from the welding torch 16 to the WCC circuitry 28). In other embodiments, the welding torch 16 may include a DAC 38 that is configured to transmit the modulated and unmodulated tones. In such situations, the WCC circuitry 28 may be configured to account or compensate or the distortion of the weld cable 36 once and/or in one direction. In either situation, the ADC 40 may be configured to receive the modulated and unmodulated tones, and may also be configured to receive the original location from which the tones were transmitted.

The ADC 40 may provide the received tones (e.g., modulated and unmodulated) to the filter function 42 for further processing. Further, in certain embodiments, the method 66 includes applying a digital filter function to the received modulated and unmodulated tones with the filter function 42 (block 72). As noted above, the digital filter function may be utilized to compare the transmitted unmodulated tones with the received unmodulated tones. As noted above, the transmitted unmodulated tones are transmitted with a known amplitude, frequency, and phase. Accordingly, in certain embodiments, the transmitted unmodulated tones may be utilized as reference tones and compared with the received unmodulated tones within the filter function 42 to determine one or more differences, such as differences in phase, amplitude, or frequency. Based on the differences between the transmitted and received unmodulated tones, the filter function 42 may be configured to determine one or more channel equalization filter coefficients. Specifically, the channel equalization filter coefficients may be representative of the distortive characteristics of the weld cable 36, as further described with respect to FIG. 3.

Further, the method 66 includes compensating for the frequency and time dependent amplitude and phase distortion (e.g., distortive characteristic of the weld cable 36) utilizing the channel equalization filter coefficients (block 74). In certain embodiments, the WCC circuitry 28 may be configured to adjust one or more welding parameters based on the one or more determined coefficients and based on the characteristics of the weld cable 36. For example, in certain situations, the WCC circuitry 28 may increase or decrease a welding voltage provided by the welding power supply 12 to the wire feeder 14 and/or the welding torch 16 based on the calculated channel equalization filter coefficients. As a further example, the WCC circuitry 28 may be configured to increase or decrease a wire speed provided by the wire feeder 14 based on the calculated channel equalization filter coefficients. In some embodiments, the WCC circuitry 28 provides this information to the control circuitry 22, so that the control circuitry 22 may make the proper adjustments to the welding parameters and/or provide the information to other components of the welding system 10. In short, the WCC circuitry 28 may be configured to provide to the welding system 10 the determined and/or calculated distortive characteristics and/or coefficients of the weld cable 36. Accordingly, the calculated or determined distortive characteristics and/or coefficients may be provided by the control circuitry 22 as actual feedback to other components of the welding system 10.

In particular, the method 66 may be utilized as a continuous feedback loop 75 that allows for the correction of power and data transmitted via the weld cable 36 in subsequent times based on the information calculated and determined. In this manner, the WCC circuitry 28 may be configured to regulate and correct for any frequency and time dependent amplitude and phase distortion in the weld cable 36 in a dynamic process during the operation of the welding torch 16. Accordingly, more accurate welding operating parameters may be utilized during the welding process. For example, with the continuous feedback loop 75, the WCC circuitry 28 may dynamically adjust the welding voltage provided to the welding torch 16 and workpiece 62 during the welding process.

FIG. 3 is a flow diagram of an embodiment of a method 76 for calculating the one or more channel equalization filter coefficients of FIG. 2, in accordance with aspects of the present disclosure. As noted above, the filter function 42 of the WCC circuitry 28 may be configured to apply a digital filter function to the modulated and unmodulated tones received by the ADC 40 and transmitted by the DAC 38. In particular, the filter function 42 may be configured to calculate or determine one or more channel equalization filter coefficients based on the modulated and unmodulated tones received by the ADC 40, as further described below.

In certain embodiments, the method 76 begins with separating the unmodulated tones from the modulated tones received by the ADC 40 (block 78). For example, in certain embodiments, the ADC 40 may receive 64 tones, of which 48 tones are modulated tones utilized for data transmission and 16 tones are unmodulated tones. Accordingly, the unmodulated tones may be separated from the modulated tones by the filter function 42 for further processing to determine the one or more coefficients.

In certain embodiments, the method further includes compensating for timing and phasing of the unmodulated tones (block 80). For example, in some situations, there may be one or more clocking variations between the DAC 38 and the ADC 40. Accordingly, the filter function 42 may be configured to compensate for the frequency error between the DAC 38 and the ADC 40 with one or more frequency and/or phase control loops. In particular, the ADC 40 may be configured to associate each transmitted tone with a corresponding received tone. For example, 16 unmodulated tones may be transmitted by the DAC 38 with a known amplitude, a known frequency, and at a known phase shift. Accordingly, each of the 16 transmitted unmodulated tones may correspond to each of the 16 received unmodulated tones. In certain embodiments, compensating for frequency and phase may include associating the transmitted tone with its corresponding received tone. In certain embodiments, the method 76 may be configured to compensate and correct for the frequency variations between the DAC 38 and the ADC 40 before separating the modulated tones from the unmodulated tones.

Furthermore, the method 76 may include measuring the characteristics (e.g., phase, amplitude and/or frequency) of the received unmodulated tones. Accordingly, in certain embodiments, the filter function 42 may be configured to measure the actual amplitude, and the actual phase of the received unmodulated tones (block 82). As noted above, the transmitted unmodulated tones may be transmitted with a known frequency, a known amplitude, and a known phase and may thus be utilized as a reference tone. Accordingly, once the actual characteristics of the received unmodulated tones are determined, the method 76 may include comparing the characteristics of the received unmodulated tones with the characteristics of the transmitted (reference) unmodulated tones (block 84). Comparing the received unmodulated tones and the transmitted (reference) unmodulated tones may be done in any suitable manner.

For example, in certain embodiments, the received unmodulated tones are multiplied by the complex conjugate of the original transmitted (reference) unmodulated tones. The expected result of a vector multiplied by its complex conjugate is a vector with an amplitude and no imaginary part. In this case, the expected answer would be "1+j0." The error vector resulting from the multiplication of the complex conjugate of the received unmodulated tones and the original transmitted (reference) tones is utilized to perform an interpolation. The interpolation populates missing members of the set of tones, at each indexed frequency, with a phasor with an interpolated amplitude and an interpolated phase. In certain embodiments, however, the actual result of a vector multiplied by its complex conjugate indicates an amplitude and phase distortion for each tone. For example, the actual answer is a series of vectors, each with amplitude and phase, for each pilot tone frequency. Accordingly, if 16 unmodulated tones received are received for an OFDM Symbol Length of 64, the actual result of the digital filter function process may be a 3×64 matrix with frequency, amplitude, and phase as column vectors and each of the 64 values assuming a row position. The 16 measured error vectors populate the positions in the 3×64 matrix assigned to the reference tones and the 48 'missing' tones, assigned to the data tones, are populated with interpolated values. The resulting 3×64 matrix is then used as the data to calculate the channel equalization filter and also the inverse of the channel equalization filter. Other reference tone versus data tone cofigurations, FFT lengths and OFDM symbol configurations are possible.

The filter function 42 may be configured to utilize the differences determined between the received unmodulated tones and the transmitted (reference) unmodulated tones to determine the channel equalization filter coefficients (block 86). As noted above, the channel equalization filter coefficients define a Finite Impulse Response (FIR) or Infinite Impulse Response (IIR) filter with a length that is determined by the number of tones used in the OFDM system, otherwise specified as the symbols in an OFDM frame, excluding any cyclic prefix, and which filter provides an inverse function to the frequency dependent amplitude and phase distortion of the weld cable 36. As further information, the inverse of the channel equalization filter is the analytic description of the two port transfer function of the weld cable as a transmission line. For example, the inverse of the channel equalization filter coefficients may be transformed, using a mathematical algorithm, to describe any characteristic or physical property of the weld cable 36 that may have an effect on the power or data transmitted by the weld cable 36. The transfer function (inverse channel equalization filter) may be representative of a length of the weld cable 36, a resistance, an inductance, and so forth. However, it should be noted that the inverse channel equalization filter (transfer function) is not the characteristic itself, but are merely an abstract representation of the characteristics as defined in a sampled time reference system.

In certain embodiments, the method 76 further includes utilizing the channel equalization filter coefficients determined from the unmodulated tones pre-distort each of the modulated and unmodulated tones that will be transmitted by the DAC 38 in the next iteration of the function (block 88). For example, the unmodulated tones may be multiplied with the modulated tones by the channel equalization (FIR) filter to correct for the frequency and time dependent amplitude and phase distortion of the weld cable 36 (e.g., distortive characteristic of the weld cable 36). Accordingly, in this manner, it may be beneficial to utilize the channel equalization filter coefficients to compensate for frequency and time dependent amplitude and phase distortion in the weld cable system (block 90).

In certain embodiments, the method 76 calculates the channel equalization filter and its inverse function. The inverse function of the channel equalization filter provides the equivalent two port transfer function of the weld cable and can be used as an element in the feedback loop within the welding power supply 12 control system, effectively replacing the voltage sense cable 92.

Figure 4:
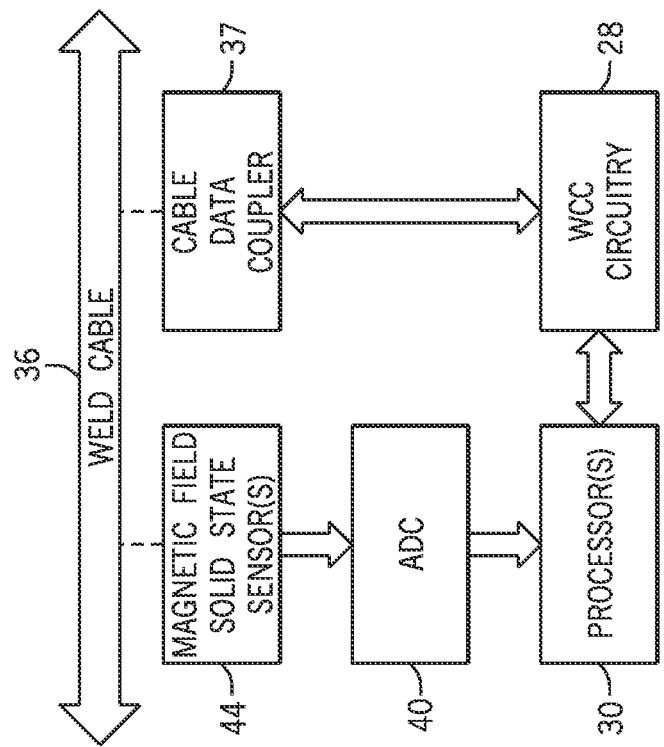
FIG. 4 is a block diagram of an embodiment of the welding system of FIG. 1, illustrating the magnetic field sensor and the WCC circuitry.

FIG. 4 is a block diagram of an embodiment of the welding system 10 of FIG. 1, illustrating the WCC circuitry 28 and the magnetic field solid state sensor(s) 44 communicatively coupled to the ADC 40, the one or more processor(s) 30 and to the weld cable 36. In the illustrated embodiment, the magnetic field solid state sensor(s) 44 may transmit signals, such as voltage signals, to the ADC 40, which may then translate the signals into digital signals delivered to the processor(s) 30. The ADC 40 may be disposed, for example, in the wire feeder 14, in the welding power supply 12, and/or proximate to the magnetic field solid state sensor(s) 44. The depicted embodiment also shows the WCC circuitry 28 operatively coupled to the weld cable 36 via the cable data coupler 37. The cable data coupler 37 may be a non-intrusive coupling system that may be attached to the outside of the weld cable 36 and sense the weld cable's magnetic field. Additionally or alternatively, the cable data coupler 37 may pierce the weld cable 36 to sense current and/or voltage from the weld cable 36 and deliver the sensed data to the WCC circuitry 28.

During operations, as the welding power supply 12 provides a specific welding process power having a desired current profile and/or a desired waveform (e.g., current waveform, voltage waveform, and so forth), information regarding the current profile and/or waveform is communicated to the WCC circuitry(s) 28 and/or stored by the processor(s) 30 (e.g., in the storage device 32 and/or the memory device 34). The communicated/stored data (e.g., expected current profile and/or waveform) may then be compared to actual current profiles and/or waveforms applied to the workpiece 62. That is, as the current is modified by, for example, the weld cable's impedance, the magnetic field solid state sensor(s) 44 may be used to observe deviations from the expected current. The processor(s) 30 may then derive and apply correction factors (e.g., gain compensation for current, voltage) to more closely deliver the desired current profile and/or waveform. Likewise, as deviations are noted, the magnetic field solid state sensor(s) 44 may be recalibrated via the processor(s) 30.

In one embodiment, the communicated/stored data becomes a template of a discrete time (sampled) function which may be transformed by a filter, such as a channel equalization filter, so as to better match the current as modified by the weld cable 36 (e.g., modified by weld cable 36 impedance). The results of applying the filter and may then be correlated with data measured via the magnetic field solid state sensor(s) 44. Data that correlates well may then be separated and saved for further use. Residual data is likely noise and not used. The saved data may then be processed to derive and apply correction factors (e.g., gain compensation for current, voltage) to more closely deliver the desired current profile and/or waveform.

If multiple welding power supplies 12 are located in relative proximity, certain interference (e.g., magnetic field noise) generated by neighboring power supplies 12 may be minimized or eliminated by the techniques described herein. Advantageously, the weld cable 36 and related grounds may be linear systems, and thus the theory of superposition holds such that a net response at a given place and time caused by two or more stimuli is the sum of the responses which would have been caused by each stimulus individually. That is, the myriad of combined signals on the weld cable 36 are likely a linear combination of separate time varying functions. A variety of DSP techniques may be used to separate out a know pattern (e.g., desired waveform). For example, principal component analysis, independent component analysis, blind or near-blind signal separation analysis (e.g., Herault-Jutten algorithms) may be used to determine the actual signal delivered by the welding power supply 12 versus signals coming from neighboring welding power supplies 12. Likewise, ambient fields may be nullified. For example, the magnetic field solid state sensor(s) 44 may be used to derive stray ambient fields and, in certain embodiments, a field generator 47 may be used to generate an opposing magnetic field in a weld region, thus nullifying the ambient fields.

As noted above, the WCC circuitry 28 may be used to characterize the weld cable 36. Improvements to this characterization may be made by applying data received from the magnetic field solid state sensor(s) 44. For example, after characterizing the weld cable 36, the WCC circuitry 28 may be used to predict current at the location of the magnetic field solid state sensor(s) 44. This prediction may be validated by the magnetic field solid state sensor(s) 44, and any deviations may be used to adjust the WCC circuitry 28. Similarly, sensor drift, or calibration of the magnetic field solid state sensor(s) 44 may be provided. The magnetic field solid state sensor(s) 44 may be calibrated in situ to account for "drifting" of readings based on elapsed time and/or environmental conditions (e.g., temperature, pressure, and so forth). For example, data measured via the magnetic field solid state sensor(s) 44 may be logged and used to determine that one or more magnetic field solid state sensors 44 may be drifting over time, or based on certain environmental conditions. Logged data may show certain patterns, such as an increase in drift over time, different measurements based on differing temperatures, and so on. The one or more magnetic field solid state sensors 44 determined to be drifting may then be re-calibrated. Additionally, the WCC circuitry 28 may be used to communicate the magnetic field solid state sensor(s) 44 data, for example, from the wire feeder 14 to the power supply 12.

Figure 5:
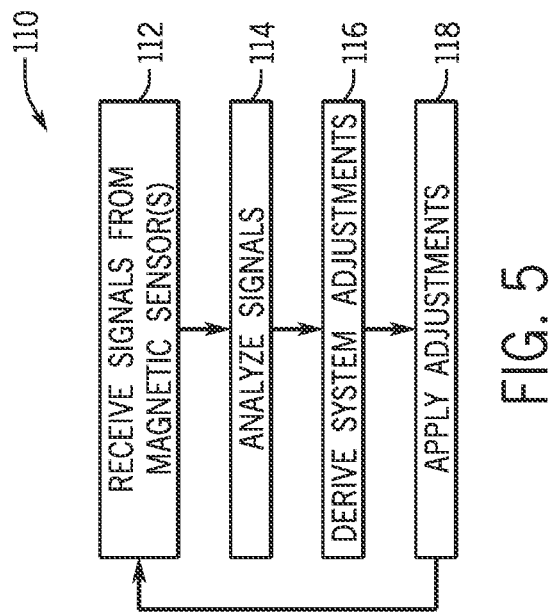
FIG. 5 is a flowchart of a process for applying the magnetic field sensor and the WCC circuitry of FIG. 1.

FIG. 5 is a flowchart of an embodiment of a process 110 suitable for applying the magnetic field sensor(s) 44 and/or the WCC circuitry 28 to improve operations of the welding system 10. In the depicted embodiment, the process 110 may include receiving signals from the magnetic field solid state sensor(s) 44, for example, signals representative of the magnetic field at a location proximate to the welding torch 16 (block 112). The signals may be converted into digital data by the ADC 40. The process 110 may then include analyzing the received data (block 114), for example, to derive a magnetic field at the sensed location(s). The analysis (block 114) may also include deriving differences between expected current and/or waveforms and actual current and/or waveforms delivered to the workpiece 62.

The analysis (block 114) may additionally include any and all derivations provided by the WCC circuitry 28, such as characterizations of the weld cable 36. The analysis (block 114) may further include DSP analyses suitable to determine influences (e.g., magnetic interference) of neighboring welding power supplies, and analyses determining ambient field magnetic fields. When multiple magnetic field solid state sensors 44 are used and positioned near each other, the analysis may include finding an average or a median value between the multiple sensors 44. When multiple magnetic field solid state sensors 44 are used and positioned apart from each other, the analysis may include deriving multiple measurements corresponding to the magnetic field of each location.

The process 110 may then include deriving adjustments (block 116) to the welding system 10 based on the data received (block 112) and/or the analysis of the data (block 114). The adjustments may include a gain compensation of the welding power delivered by the welding power supply 12, adjustments to voltage/current delivered by the welding power supply 12, adjustments to the derivations of the characterizations determined by using the WCC circuitry 28, adjustments to nullify ambient fields, and/or adjustments to calibrate the magnetic field solid state sensor(s) 44, and adjustments to better operate the welding power supply 12 (e.g., adjustments to current, voltage, when there are contributions of stray magnetic fields from adjacent welding processes). The process 110 may then including applying the adjustments (block 118) to improve system operations, for example, by compensating gain, adjusting power of the welding power supply 12, adjusting derivations of the WCC circuitry 28, nullifying ambient magnetic fields, and subtracting contributions of stray magnetic fields from adjacent welding processes. For example, the magnetic generator 47 may be used to provide for an opposite magnetic field.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A welding system, comprising:
a welding power supply comprising control circuitry and power conversion circuitry, the power conversion circuitry configured to provide welding power, and the control circuitry configured to control the power conversion circuitry to provide the welding power;
a weld cable coupled to the welding power supply and configured to transmit the welding power;
a welding torch coupled to the weld cable and configured to apply the welding power to produce a welding arc;
weld cable communications (WCC) circuitry having a transmitter and a receiver and configured to transmit and to receive one or more modulated or unmodulated tones to provide a characterization of properties of the weld cable; and
a magnetic field sensor disposed on the weld cable proximate the welding torch, wherein the magnetic field sensor is configured to detect a signal representative of a current in the weld cable proximate to the welding torch,
wherein the control circuitry is further configured to control the power conversion circuitry to adjust the welding power based at least in part on the characterization of the properties of the weld cable.

2. The welding system of claim 1, wherein the magnetic field sensor comprises a solid state magnetic field sensor, and the solid state magnetic field sensor comprises a microelectromechanical system (MEMS) or a flux gate magnetometer.

3. The welding system of claim 1, wherein the control circuitry is configured to recalibrate the magnetic field sensor, to nullify an ambient field detected by the magnetic field sensor, or to subtract a contribution of a stray magnetic field from an adjacent welding system process detected by the magnetic field sensor, based at least in part on the comparison of the signal received from the magnetic field sensor to the reference signal.

4. The welding system of claim 1, wherein the WCC circuitry is configured to transmit the one or more modulated or unmodulated tones, or to receive the one or more modulated or unmodulated tones, and to derive the characterization of the properties of the weld cable via a digital filter function.

5. The welding system of claim 4, wherein the WCC circuitry is configured to:
transmit an initial modulated tone and an initial reference tone through the weld cable from the transmitter;
receive a modulated tone and a reference tone through the weld cable at the receiver;
apply the digital filter function to the reference tone to determine one or more differences between a template for the initial reference tone and the received reference tone; and
determine one or more channel equalization filter coefficients based on the differences between the template reference tone and the received reference tone.

6. The welding system of claim 1, wherein the magnetic field sensor comprises a three axis sensor or a two axis sensor.

7. The welding system of claim 1, comprising an analog to digital converter (ADC) and a processor disposed proximate to the magnetic field sensor, wherein the ADC is configured to convert the signal into digital data and wherein the processor is configured to receive the digital data from the ADC to derive an adjustment to the magnetic field sensor.

8. A method, comprising:
receiving, via control circuitry, a signal via a weld cable from a magnetic field sensor disposed on the weld cable proximate to a welding torch performing a welding system operation, wherein the weld cable is configured to transmit welding power to the welding torch;
analyzing, via the control circuitry, the signal to determine a current, an ambient field, or a stray magnetic field from an adjacent welding system process;
deriving, via the control circuitry, an adjustment to a welding system based on the determined current, ambient field, or stray magnetic field, wherein the adjustment comprises one or more of a recalibration of the magnetic field sensor, a nullification of the ambient field, or a subtraction of a contribution of the stray magnetic field; and
applying, via the control circuitry, the adjustment to the welding system.

9. The method of claim 8, wherein deriving the adjustment comprises characterizing properties of the weld cable to determine an expected current waveform through the weld cable during the welding system operation, and comparing the expected current waveform to an actual current waveform measured via the magnetic field sensor.

10. The method of claim 9, wherein characterizing the properties of the weld cable comprises:
transmitting an initial modulated tone and an initial reference tone through the weld cable from a transmitter;
receiving a modulated tone and a reference tone through the weld cable at a receiver;
applying a digital filter function to the reference tone to determine one or more differences between a template for the initial reference tone and the received reference tone; and
determining one or more channel equalization filter coefficients based on the differences between the template reference tone and the received reference tone.

11. A welding system, comprising:
a weld cable configured to be coupled between a welding power supply and a welding torch and to transmit welding power from the welding power supply to the welding torch;
weld cable communications (WCC) circuitry configured to transmit and receive tones to characterize properties of the weld cable, and to send data to the welding power supply when the welding power supply is coupled to the weld cable; and a magnetic field sensor disposed on the weld cable and configured to sense a magnetic field around the weld cable, the magnetic field being at least partially indicative of a welding current through the weld cable, wherein the data sent to the welding power supply, via the weld cable, relates to the welding current.

12. The welding system of claim 11, comprising the welding power supply, wherein the welding power supply is configured to adjust a welding current, or a welding voltage, based at least in part on comparing an expected welding current to a signal representative of the welding current.

13. The welding system of claim 12, wherein the tones comprise one or more modulated or unmodulated tones utilized by the WCC circuitry to characterize the properties of the weld cable.

14. The welding system of claim 11, wherein the magnetic field sensor comprises a microelectromechanical system (MEMS), a Hall effect sensor, or a flux gate magnetometer.

15. The welding system of claim 11, wherein the magnetic field sensor comprises a three axis sensor, or a two axis sensor, or a one axis sensor.

16. The welding system of claim 1, wherein the magnetic field sensor is disposed on the weld cable less than approximately 5 inches from the welding torch.

17. The welding system of claim 11, further comprising a field generator configured to generate an opposing magnetic field in a weld region, wherein the WCC circuitry is further configured to derive an ambient magnetioc field from the magnetic field, and wherein the opposing magnetic field is configured to nullify the ambient magnetic field.

18. The welding system of claim 11, further comprising control circuitry configured to control the welding power supply, wherein the WCC circuitry is further configured to predict a future current through the weld cable where the magnetic field sensor is disposed, and wherein the control circuitry is configured to adjust the WCC circuitry based on a difference between the predicted future current and the welding current sensed by the magnetic field sensor.

* * * * *